Patented Sept. 4, 1923.

1,467,091

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing.   Application filed April 5, 1921.   Serial No. 458,742.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in methyl acetate or monochlornaphthalene, it has been found that such single solvents by themselves will not dissolve a sufficient proportion of the ethers to make a desirably thick flowable composition or dope, such, as may be used in the manufacture of photographic film base by the customary methods, and in the other plastic arts.

I have discovered that an adequately strong and useful solvent may be prepared by mixing methyl acetate with a co-operating solvent, like monochlornaphthalene. The proportions of the mixture may vary widely, but I find that useful solvents may be prepared, for instance, by mixing from 50 to 60 parts by weight of methyl acetate with 50 to 40 parts of monochlornaphthalene. While the amount of cellulose ether which may be dissolved in my compound solvents can be altered considerably, I find the following illustrative proportions to be useful. 1 part of water-insoluble cellulose is dissolved in 5 parts of my compound solvent, giving a thick viscous flowable solution. Other substances which impart additional suppleness, or incombustibility, or other qualities, to the film may be added to the dope, such, for example, as triphenyl phosphate, tricresyl phosphate, camphor, etc.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A compound solvent for alkyl ethers of cellulose, comprising methyl acetate and monochlornaphthalene.

2. A compound solvent for alkyl ethers of cellulose, comprising 50 to 60 parts by weight of methyl acetate and 50 to 40 parts by weight of monochlornaphthalene.

3. A viscous flowable film-forming composition, comprising an alkyl ether of cellulose dissolved in a mixture of methyl acetate and monochlornaphthalene.

4. A viscous flowable film-forming composition, comprising an alkyl ether of cellulose dissolved in a compound solvent containing from 50 to 60 parts by weight of methyl acetate and from 50 to 40 parts of monochlornaphthalene.

5. A composition of matter comprising 1 part of water-insoluble ethyl cellulose dissolved in approximately 5 parts by weight of a compound solvent containing methyl acetate and monochlornaphthalene.

Signed at Rochester, New York, this 30th day of March, 1921.

STEWART J. CARROLL.